United States Patent
Li et al.

(10) Patent No.: US 10,834,783 B2
(45) Date of Patent: Nov. 10, 2020

(54) ADJUSTING ATTRIBUTE OF REMOTE UNIT BASED ON INFORMATION REGARDING INTERFERING DEVICE TO CAUSE SUBSCRIBER UNIT TO CONNECT TO AND/OR CAMP ON REMOTE UNIT RATHER THAN INTERFERING DEVICE

(71) Applicant: CommScope Technologies LLC, Hickory, NC (US)

(72) Inventors: Zhao Li, Forest, VA (US); Zhen Guo, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/347,490

(22) PCT Filed: Nov. 3, 2017

(86) PCT No.: PCT/US2017/059994
§ 371 (c)(1),
(2) Date: May 3, 2019

(87) PCT Pub. No.: WO2018/085692
PCT Pub. Date: May 11, 2018

(65) Prior Publication Data
US 2020/0059994 A1 Feb. 20, 2020

Related U.S. Application Data

(60) Provisional application No. 62/417,189, filed on Nov. 3, 2016.

(51) Int. Cl.
*H04W 24/02* (2009.01)
*H04W 88/08* (2009.01)
(Continued)

(52) U.S. Cl.
CPC ........ *H04W 88/085* (2013.01); *H04B 17/327* (2015.01); *H04W 36/06* (2013.01);
(Continued)

(58) Field of Classification Search
None
See application file for complete search history.

(56) References Cited

U.S. PATENT DOCUMENTS

2010/0278530 A1* 11/2010 Kummetz ........... H04W 88/085
398/41
2012/0257516 A1* 10/2012 Pazhyannur ........... H04B 7/024
370/252

(Continued)

FOREIGN PATENT DOCUMENTS

| WO | 2010151822 A1 | 12/2010 |
| WO | 2015196129 A1 | 12/2015 |
| WO | 2016056000 A1 | 4/2016 |

OTHER PUBLICATIONS

International Searching Authority, "International Search Report and Written Opinion from PCT Application No. PCT/US2017/059994 dated Mar. 22, 2018", pp. 1-13, Published: WO.

(Continued)

*Primary Examiner* — Brandon M Renner
(74) *Attorney, Agent, or Firm* — Fogg & Powers LLC

(57) ABSTRACT

A remote unit of a distributed antenna system (DAS) includes: interface device configured to interface with an upstream component of the DAS; and receiver communicatively coupled to an antenna and configured to receive signals from at least one subscriber unit within a coverage area of the DAS. The receiver temporarily reconfigured to receive interference signals from an interfering device outside of the coverage area of the DAS. The interference signals cause a subscriber unit to establish a connection with the interfering device rather than the remote unit of the DAS.

(Continued)

Figure 1A:
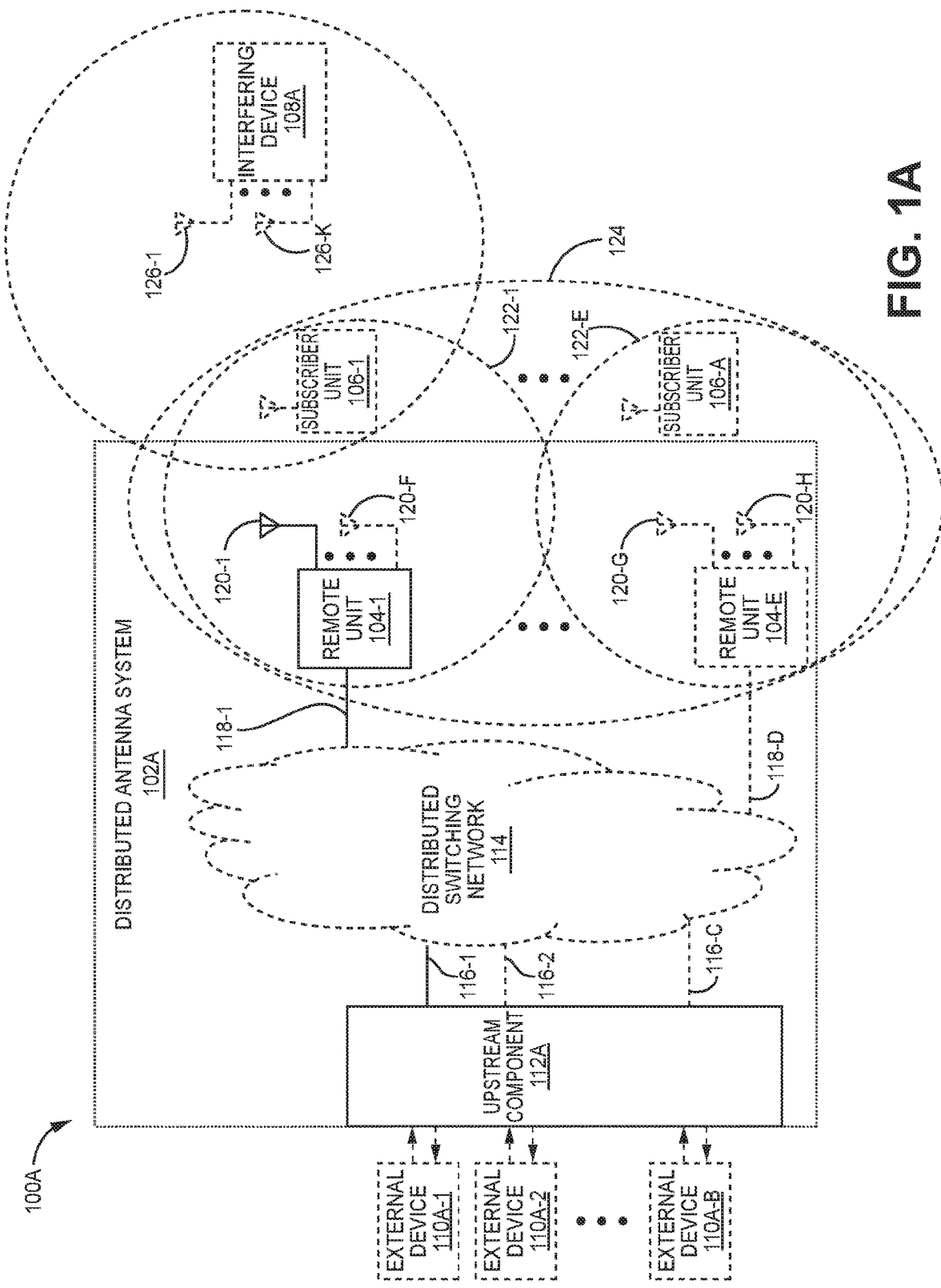

The remote unit configured to derive information about the interfering device from the interference signals. The remote unit configured to adjust at least one attribute to cause the subscriber unit to establish connection with the remote unit rather than the interfering device.

20 Claims, 5 Drawing Sheets

(51) Int. Cl.
*H04B 17/327* (2015.01)
*H04W 36/06* (2009.01)
*H04W 48/12* (2009.01)
*H04W 48/20* (2009.01)
*H04W 52/24* (2009.01)
*H04W 72/08* (2009.01)
*H04W 92/20* (2009.01)

(52) U.S. Cl.
CPC ........... *H04W 48/12* (2013.01); *H04W 48/20* (2013.01); *H04W 52/243* (2013.01); *H04W 72/082* (2013.01); *H04W 92/20* (2013.01)

(56) References Cited

U.S. PATENT DOCUMENTS

| | | |
|---|---|---|
| 2013/0260705 A1 | 10/2013 | Stratford |
| 2013/0295980 A1 | 11/2013 | Reuven et al. |
| 2013/0343346 A1* | 12/2013 | Chen ............... H04W 72/1231 370/332 |
| 2014/0024402 A1* | 1/2014 | Singh ................. H04B 17/23 455/501 |
| 2014/0219255 A1 | 8/2014 | Eyuboglu et al. |
| 2014/0376499 A1 | 12/2014 | Kummetz et al. |
| 2015/0249965 A1 | 9/2015 | Dussmann et al. |
| 2016/0135184 A1 | 5/2016 | Zavadsky et al. |
| 2016/0221039 A1* | 8/2016 | Fuchs ................ G01R 31/00 |
| 2016/0309340 A1* | 10/2016 | Malach ............. H04L 5/0057 |
| 2016/0309419 A1 | 10/2016 | Makhlouf et al. |
| 2017/0359763 A1* | 12/2017 | Pan ..................... H04B 7/0814 |
| 2018/0103384 A1* | 4/2018 | Berlin ................ H04W 24/02 |

OTHER PUBLICATIONS

European Patent Office, "Extended European Search Report from EP Application No. 17867915.5", from Foreign Counterpart to U.S. Appl. No. 16/347,490, dated May 6, 2020, p. 1 through 13, Published: EP.

* cited by examiner

US 10,834,783 B2

ADJUSTING ATTRIBUTE OF REMOTE UNIT BASED ON INFORMATION REGARDING INTERFERING DEVICE TO CAUSE SUBSCRIBER UNIT TO CONNECT TO AND/OR CAMP ON REMOTE UNIT RATHER THAN INTERFERING DEVICE

CROSS-REFERENCE TO RELATED APPLICATIONS

This application is a U.S. National Stage Patent Application of International Application PCT/US2017/059994 filed on Nov. 3, 2017 and titled "ADJUSTING ATTRIBUTE OF REMOTE UNIT BASED ON INFORMATION REGARDING INTERFERING DEVICE TO CAUSE SUBSCRIBER UNIT TO CONNECT TO AND/OR CAMP ON REMOTE UNIT RATHER THAN INTERFERING DEVICE", which claims the benefit of U.S. Provisional Patent Application Serial No. 62/417,189 filed on Nov. 3, 2016, the contents of all of which are incorporated herein by reference.

BACKGROUND

One way that a wireless cellular service provider can improve the coverage provided by a base station or group of base stations is by using a distributed antenna system (DAS). A DAS typically includes one or more master units and one or more remote units that are communicatively coupled to the master units. The one or more master units are typically connected to at least one wireless radio access technology signal source, such as at least one service provider's base station. Various methods of transporting the wireless radio access technology signal from the signal source to the antenna have been implemented in the art. One type of DAS is an analog DAS, in which DAS traffic is distributed between the master units and the remote units in analog form. Another type of DAS is a digital DAS, in which DAS traffic is distributed between the master units and the remote units in digital form. Another type of DAS is a hybrid DAS, in which DAS traffic is distributed between the master units and the remote units using a combination of digital and analog form. Remote units in a DAS are typically communicatively coupled to a master unit via at least one wired communication link, though wireless links are also possible.

SUMMARY

A remote unit of a distributed antenna system (DAS) includes: at least one interface device configured to interface with an upstream component of the DAS; and at least one receiver communicatively coupled to an antenna and configured to receive signals from at least one subscriber unit within a coverage area of the DAS. The at least one receiver is temporarily reconfigured to receive interference signals from at least one interfering device outside of the coverage area of the DAS, wherein the interference signals cause the at least one subscriber unit to establish a connection with the at least one interfering device rather than the remote unit of the DAS. The remote unit is configured to derive information about the at least one interfering device from the interference signals. The remote unit is configured to adjust at least one attribute of the remote unit to cause the at least one subscriber unit to establish a connection with the remote unit rather than the at least one interfering device.

DRAWINGS

Figure 1B:
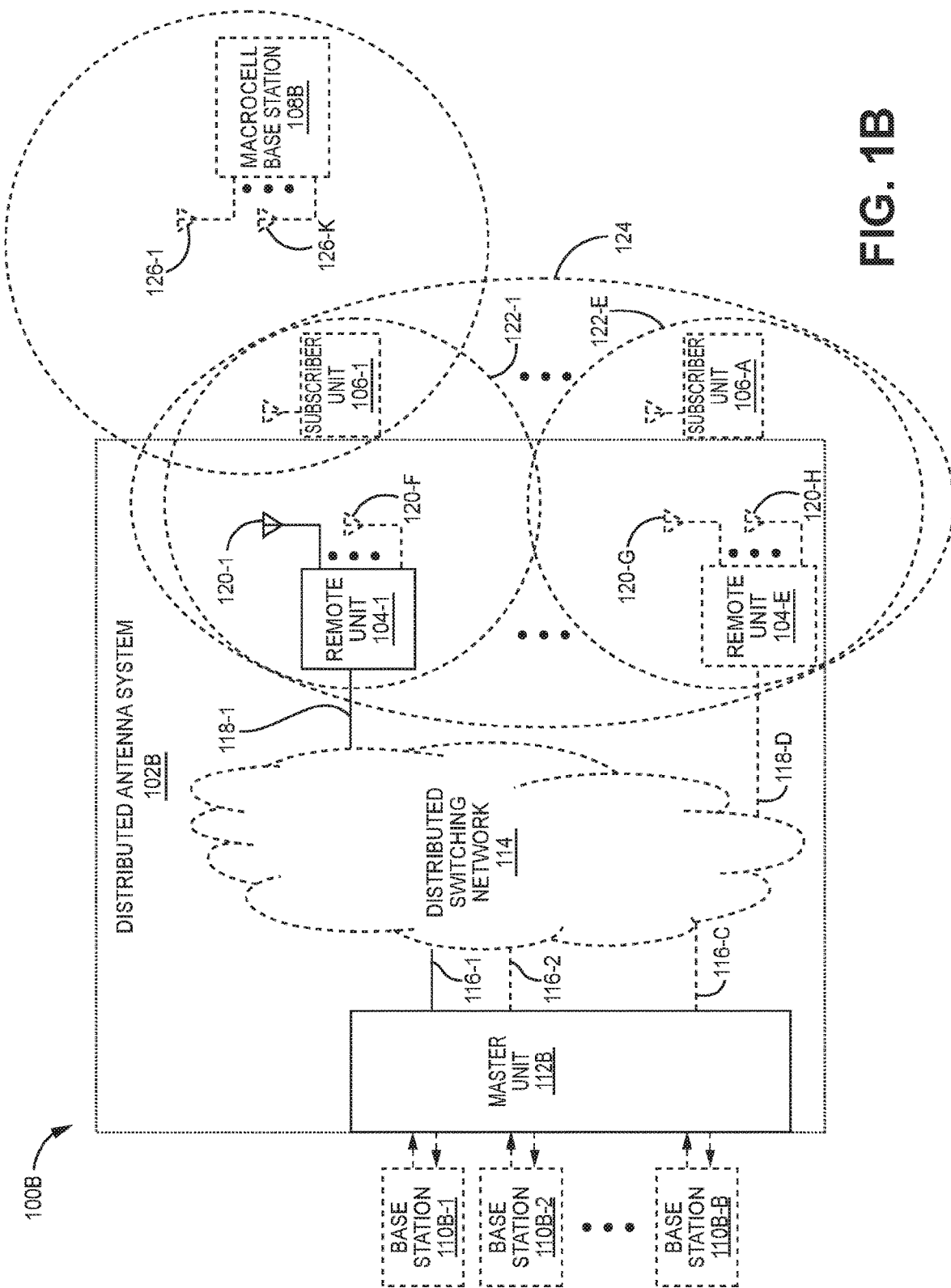
Figure 1C:
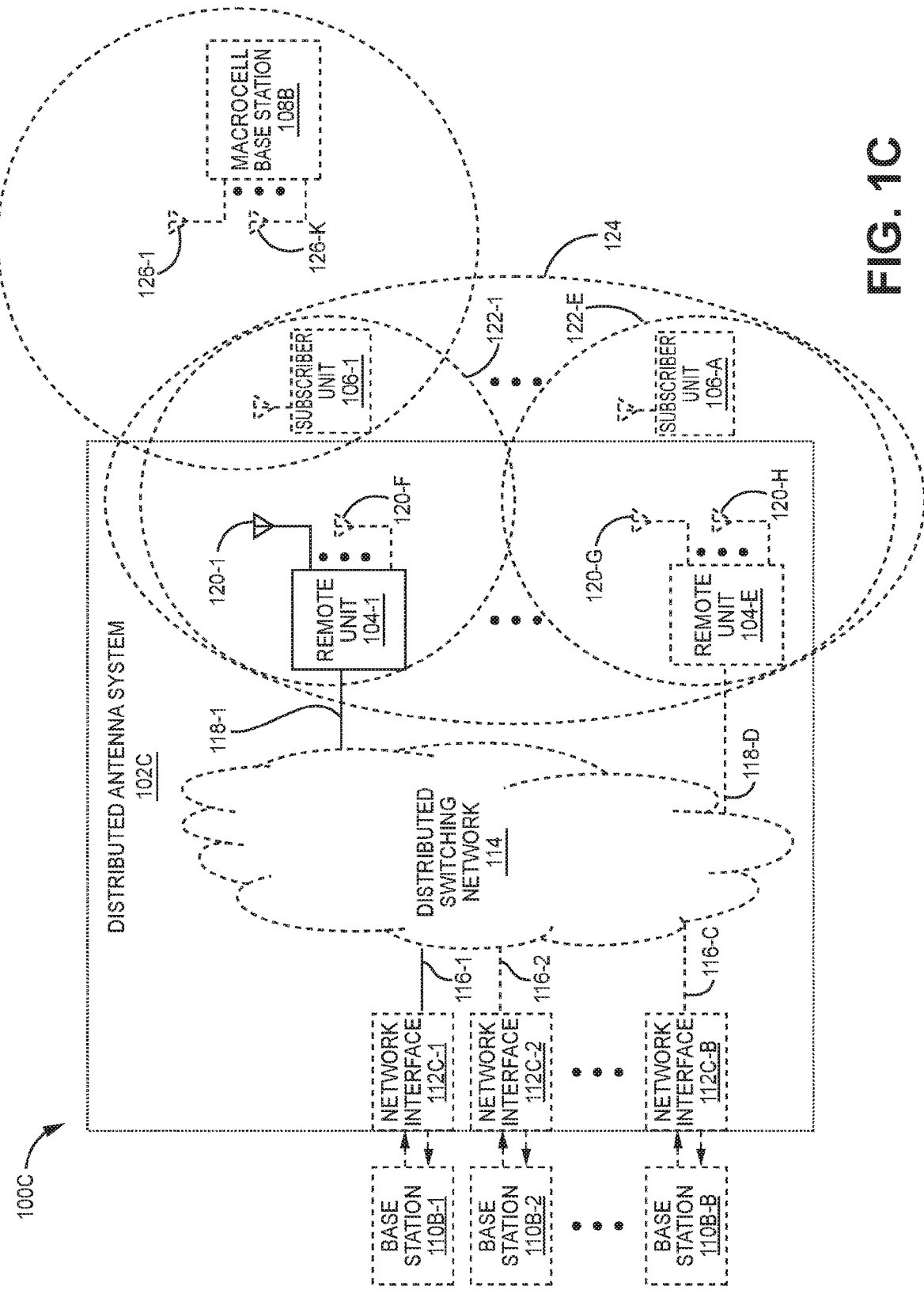
Figure 2:
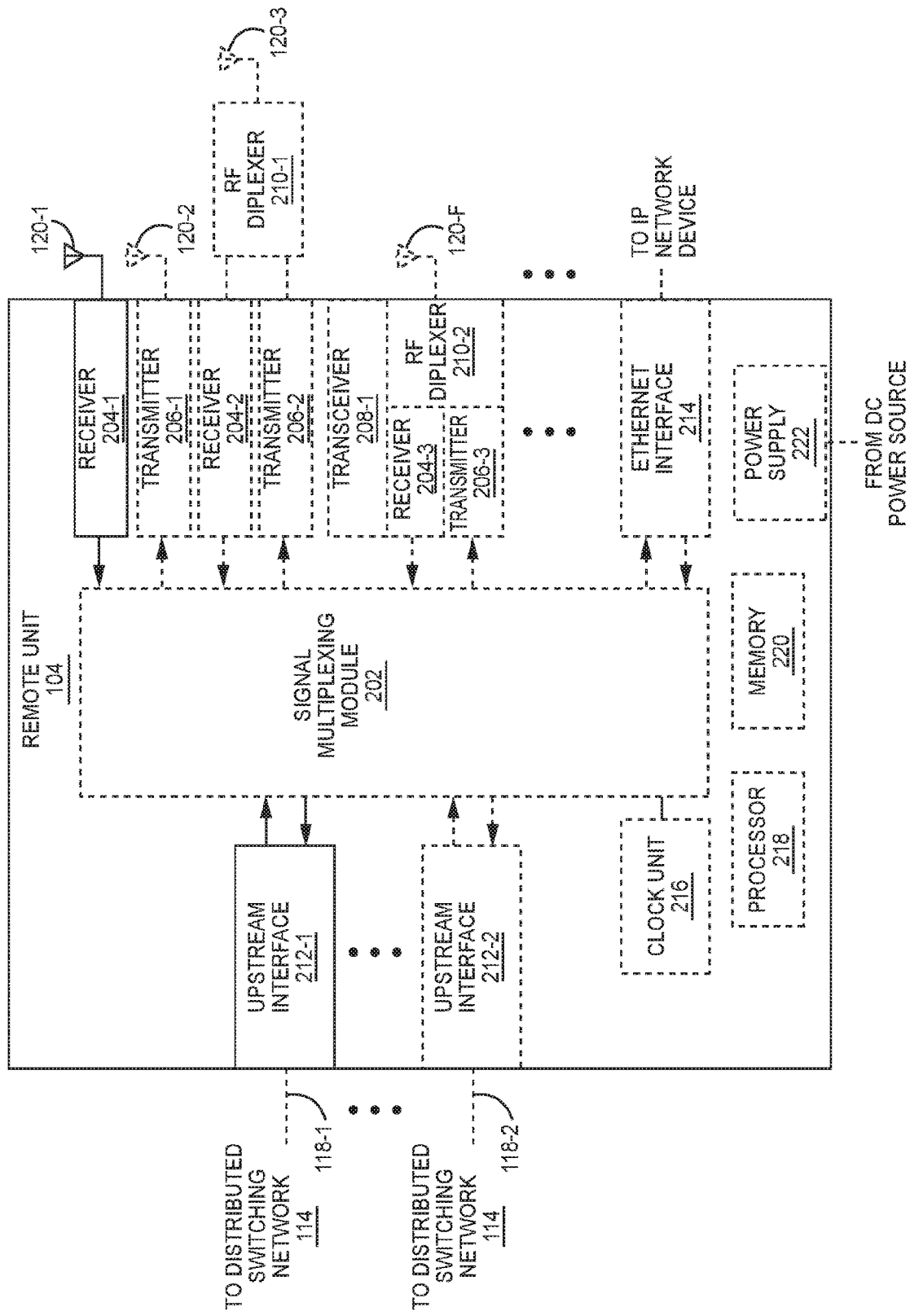
Figure 3:
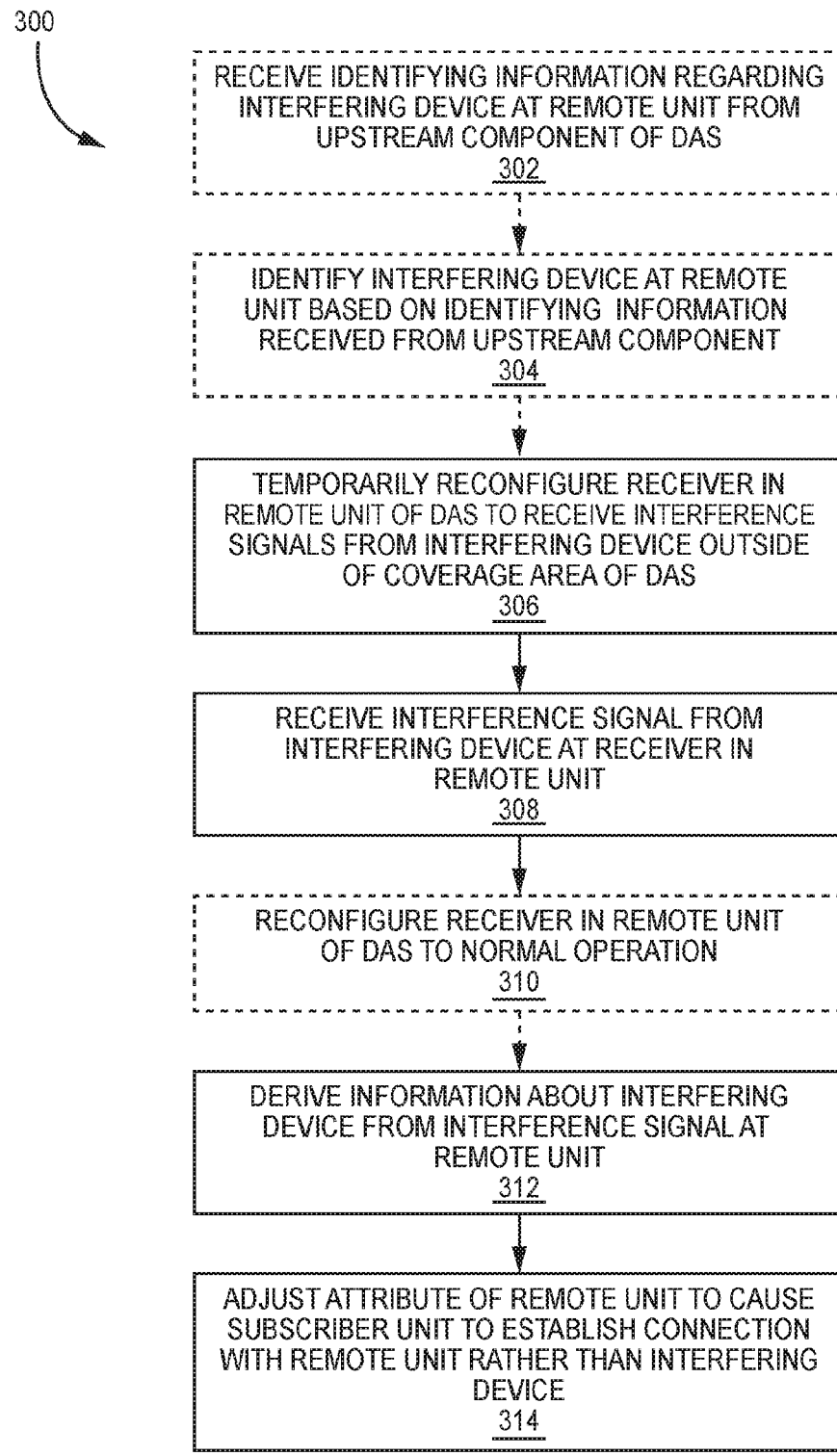

Understanding that the drawings depict only exemplary embodiments and are not therefore to be considered limiting in scope, the exemplary embodiments will be described with additional specificity and detail through the use of the accompanying drawings, in which:

FIGS. 1A-1C are block diagrams of exemplary embodiments of distributed antenna systems;

FIG. 2 is a block diagram of an exemplary embodiment of a remote unit used in distributed antenna systems, such as the exemplary distributed antenna systems in FIGS. 1A-1C; and FIG. 3 is a flow diagram illustrating one exemplary embodiment of a method for adjusting at least one attribute of a remote unit in a distributed antenna system based on information regarding at least one interfering device.

In accordance with common practice, the various described features are not drawn to scale but are drawn to emphasize specific features relevant to the exemplary embodiments. Like reference numbers and designations in the various drawings indicate like elements.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below describe a distributed antenna system (DAS) having at least one master unit and at least one remote unit inside a building, other structure, or other enclosed space. At least one radio frequency (RF) signal from a macrocell base station (or other interference device, such as a different remote unit of a different distributed antenna system, a remote radio head of a distributed base station, or a small-cell base station such as a femtocell, picocell, or microcell) can penetrate through the walls and/or boundaries of the building, other structure, or other enclosed space. These RF signals from the macrocell base station can interfere with the radio frequency signals emitted from the remote units of the DAS. The interfering RF signals from outside the DAS coverage area cause interference because they are on the same frequency, band, etc. as the signals transmitted from the remote units of the DAS. This is particularly a problem when the RF signals from the macrocell base station are high power and/or when the RF signals from the macrocell base station are transmitted from nearby antennas. While this description below focuses on RF signals from outside of the walls and/or boundaries of the building, other structure, or other enclosed space coming from a macrocell base station, it is understood that these interference RF signals can come from other sources, such as from remote units of other distributed antenna systems, remote radio heads of distributed base stations, etc. In addition, while this description focuses on reconfiguring a remote unit of a distributed antenna system to receive interference signals from an interfering device to make decisions on how to adjust attributes of the remote unit to cause subscriber units to connect to and/or camp on the remote unit rather than the interfering device, it is understood that the remote unit can be a remote radio head of a distributed base station or another fixed-location transceiver of a wireless communication system that would benefit from adjusting attributes to cause subscriber units to connect to and/or camp on the access device rather than an interfering device.

In order to improve the coverage inside the coverage area of the DAS while these interfering signals from outside the coverage area are present, the remote units of the DAS can increase their transmission power to make sure they have adequate signal to noise ratio (SNR) for subscriber units who are close to the perimeter of the coverage area (such as just inside building walls), to overcome the higher power interference signals from outside of the coverage area (such as generally within the building walls). In exemplary embodiments, the remote units of the DAS can increase their transmission power intelligently based on information received from the interfering devices outside of the DAS coverage area.

The embodiments described below describe remote units that are reconfigured to receive signals from interfering devices to determine how to adjust the signal being transmitted from the remote units. In some implementations, the remote units receive information regarding the interfering device from an upstream component from within the DAS, such as a master unit or a network interface unit.

The techniques described herein are useful in connection with the distribution of wireless communications that use licensed radio frequency spectrum, such as cellular radio frequency communications utilizing various radio access technologies (RAT). In exemplary embodiments, radio access technologies (RAT) may operate using various wireless protocols and in various bands of frequency spectrum. For example, the radio access technologies (RAT) may include, but are not limited to, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), Wideband Code Division Multiple Access (W-CDMA), 2100 MHz Universal Mobile Telecommunications System (UMTS), Universal Mobile Telecommunications System Frequency-Division Duplexing (UMTS-FDD), Worldwide Interoperability for Microwave Access (WiMAX), 3rd Generation Partnership Projects (3GPP) Long Term Evolution (LTE), High Speed Packet Access (HSPA), or other appropriate communication services. The system described herein are capable of transporting both Single Input Single Output (SISO) and Multiple Input Multiple Output (MIMO) services at any of the frequencies described above. The systems described herein can support any combination of SISO and MIMO signals across various bands of frequency spectrum. In some example embodiments, the systems described herein may provide MIMO streams for WiMAX, LTE, and HSPA services while only providing SISO streams for other services. Other combinations of MIMO and SISO services are used in other embodiments.

In exemplary embodiments, the upstream component is communicatively coupled to at least one component of a distributed antenna system which is coupled to at least one remote unit. In other embodiments, the upstream component is directly coupled with the remote unit or is included with the remote unit in a single device. While exemplary embodiments are described in the context of distributed antenna systems (DAS) within this description, it is understood that exemplary embodiments also apply in distributed base stations having remote radio heads, cloud radio access networks (C-RAN), and/or hybrid DAS/C-RAN systems. In exemplary embodiments, the upstream component is communicatively coupled to at least one upstream device, such as a base station, either directly or through a fronthaul network. In exemplary embodiments, the upstream component is at least one of a Common Public Radio Interface (CPRI) base station interface, an Open Base Station Architecture Initiative (OBSAI) base station interface, and an Open Radio Interface (ORI) base station interface. In exemplary embodiments, the upstream component communicates with an external device. In exemplary embodiments, the external device is one of a Common Public Radio Interface (CPRI) device interface, an Open Base Station Architecture Initiative (OBSAI) device interface, and an Open Radio Interface (ORI) device interface. In exemplary embodiments, the upstream component communicates with the external device using signals formatted according to at least one of a Common Public Radio Interface (CPRI) standard, an Open Base Station Architecture Initiative (OBSAI) standard, and an Open Radio Interface (ORI) standard.

In exemplary embodiments, the remote unit is multi-standard and capable of receiving at least one signal, converting it to radio frequency (RF), and transmitting the RF signal using at least one antenna. In exemplary embodiments, the remote unit is not specific to a number of channels or an air protocol and does not necessarily require any hardware change when channels are added or removed, or a new modulation type or air protocol is used. In exemplary embodiments, the signals communicated with the upstream device are channelized signals, which are specific to a particular channel. In exemplary embodiments, the channelized signals are baseband data, such as channelized in-phase (I) and quadrature (Q) data in I/Q pairs. The channelized signals are not positioned relative to one another and require additional baseband conversion before RF conversion and transmission can be performed. Specifically, if channelized signals are communicated to a remote unit, additional processing would be required at the remote unit to convert the channelized signals before RF conversion and transmission.

FIGS. 1A-1C are block diagrams of exemplary embodiments of communication systems 100. Each of FIGS. 1A-1C illustrates a different embodiment of a communication system, labeled 100A-100C respectively.

FIG. 1A is a block diagram of an exemplary embodiment of a communication system 100A. Communication system 100A includes a distributed antenna system (DAS) 102A having at least one remote unit 104 (such as remote unit 104-1 through any quantity of optional remote units 104 through optional remote unit 104-E), at least one subscriber unit 106 (such as subscriber unit 106-1 and any quantity of optional subscriber units 106 through optional subscriber unit 106-A), and at least one upstream component 112A.

The DAS 102A is communicatively coupled to external devices 110 (such as optional external device 110A-1 and any quantity of optional external devices 110A through optional external device 110A-B) through at least one upstream component 112 (such as upstream component 112A). In exemplary embodiments, the at least one upstream component 112 interfaces with the external devices 110 using digital, analog, wired, and/or wireless communication. In exemplary embodiments, the at least one upstream component 112 performs conversion, processing, and/or switching of signals received from the external devices 110 and communicates signals via medium 116 (such as medium 116-1 and any quantity of optional media 116 through optional medium 116-C) through optional distributed switching network 114, and to at least one remote unit 104 (such as remote unit 104-1 through any quantity of optional remote units 104 through optional remote unit 104-E) through media 118 (such as media 118-1 and any quantity of optional media 118 through optional medium 118-D).

In exemplary embodiments, the media 116 and 118 are any combination of wired and/or wireless media. In exemplary embodiments, at least some of the media 116 and 118 include optical fibers and the communication across the optical fibers is optical. In these embodiments, an electrical to optical conversion and/or an optical to electrical conversion occurs in at least one of the upstream components 112A, distributed switching network 114, and/or remote units 104. In exemplary embodiments, at least some of the media 116 and 118 include conductive cables (such as coaxial cable, twisted pair, category cabling, etc.) and the communication across the conductive cables is electrical. In exemplary embodiments, at least some of the communication across the media 116 and 118 is digital. In exemplary embodiments, at least some of the communication across the media 116 and 118 is analog. In exemplary embodiments, any mixture of optical, electrical, analog, and digital communication occurs across the media 116 and 118. In exemplary embodiments, a remote unit 104 may include functionality to convert between digital and analog signals.

In exemplary embodiments, the upstream component 112A is communicatively coupled to at least one external device 110 either directly or through an optional fronthaul network. In exemplary embodiments, the optional fronthaul network includes one or more intermediary devices positioned between the at least one upstream component 112A and at least one external device 110A. In exemplary embodiments, the one or more intermediary devices in the optional fronthaul network are configured to convert channelized uplink signals received from the at least one external device 110A into an uplink output for the external device 110A, such as a CPRI and/or OB SAI link. In exemplary embodiments, the one or more intermediary devices in the optional fronthaul network multiplex multiple channels into one or more upstream links (such as upstream CPRI links). In exemplary embodiments, any number of channels can be multiplexed into any (equal or smaller) number of CPRI links in the optional fronthaul network and be communicated to the at least one upstream device (such as one or more base stations).

Each external device 110A is configured to communicate signals transported through the DAS 102A with the at least one upstream component 112A. In the forward path, the at least one upstream component 112A is configured to receive signals from at least one external device 110A. In exemplary embodiments, the upstream component 112A is also communicatively coupled to the optional distributed switching network 114 across at least one media 116. As described in more detail below, the upstream component 112A is configured to convert first downlink signals from the external device 110A to which it is communicatively coupled into second downlink signals. In exemplary embodiments, the upstream component 112A is configured to communicate the second downlink signals to at least one remote unit 104 either directly or through optional distributed switching network 114 or other components of the DAS 102A across a respective medium 116.

Similarly in the reverse path, in exemplary embodiments the upstream component 112A is configured to receive an uplink signal across a respective medium 116 from a remote unit 104, either directly or through optional distributed switching network 114. In exemplary embodiments, the uplink signal is a distributed antenna system uplink signal having a transport format used by a distributed antenna system, such as a digital distributed antenna system transport format or a full band (at radio frequency or intermediate frequency) analog distributed antenna system transport format. In exemplary embodiments, the uplink signal includes one or more channels from at least one remote unit 104.

In exemplary embodiments, optional distributed switching network 114 couples the at least one upstream component 112A with the at least one remote unit 104. In other embodiments, the at least one remote unit 104 is directly coupled to the at least one upstream component 112A. Distributed switching network 114 may include one or more distributed antenna switches or other components that functionally distribute downlink signals from the at least one upstream component 112A to the at least one remote unit 104. Distributed switching network 114 also functionally distributes uplink signals from the at least one remote unit 104 to the at least one upstream component 112A. In exemplary embodiments, the distributed switching network 114 can be controlled by a separate controller or another component of the system. In exemplary embodiments, the switching elements of the distributed switching network 114 are controlled either manually or automatically. In exemplary embodiments, the routes can be pre-determined and static. In other exemplary embodiments, the routes can dynamically change based on time of day, load, or other factors.

In exemplary embodiments, at least some of the uplink signals communicated within the DAS 102A are digital signals. In exemplary embodiments, at least some of the uplink signals communicated within the DAS 102A are analog signals that contains at least one individual channel that is positioned within a set of spectrum that reflects its location within radio frequency spectrum when converted to a radio frequency (RF) signal. Said another way, the channel in each uplink signal is at a different frequency than the other channels to which it may be aggregated in the distributed switching network 114. In exemplary embodiments, at least some of the uplink signals communicated within the DAS 102A across the communication media 118 are analog signals and are converted to a digital signal at an intermediary device positioned within the distributed switching network 114 and communicated to the upstream component 112A as digital signals.

Each remote unit 104 is communicatively coupled to the distributed switching network 114 across at least one medium 118. Specifically, remote unit 104-1 is communicatively coupled to the distributed switching network 114 across medium 118-1 and optional remote unit 104-E is communicatively coupled to the distributed switching network 114 across medium 118-D. In exemplary embodiments, some or all of the remote units 104 receive a single downlink signal from the distributed switching network 114 or directly from an upstream component 112A. In exemplary embodiments, some or all of the remote units 104 include components configured to convert between at least one downlink signal received through the DAS 102A and at least one radio frequency band as well as at least one radio frequency antenna 120 (such as radio frequency antenna 120-1 and any quantity of optional radio frequency antennas 120 through radio frequency antenna 120-H) configured to transmit and receive signals in the at least one radio frequency band to at least one subscriber unit 106 (such as subscriber unit 106-1 and any quantity of optional subscriber units 106 through optional subscriber unit 106-A). In exemplary embodiments, the downlink signal is an aggregate signal including signals from multiple upstream devices. In exemplary embodiments, multiple downlink radio frequency channels are supported on a single band (such as for example two W-CDMA channels on a single band).

In the downstream, each remote unit 104 is configured to convert at least one downlink signal into a downlink radio frequency (RF) signal in a radio frequency band. In exemplary embodiments, this may include digital to analog converters and oscillators. Each remote unit 104 is further configured to transmit the downlink radio frequency signal in the radio frequency band to at least one subscriber unit using at least one radio frequency antenna 120. In a specific exemplary embodiment, remote unit 104-1 is configured to convert the downlink signal received either directly from the upstream component 112A or through the distributed switching network 114 into a downlink radio frequency signal in a radio frequency band. Remote unit 104-1 is further configured to transmit the downlink radio frequency signal in a radio frequency band using a radio frequency band radio frequency antenna 120-1 to at least the one subscriber unit 106-1. In exemplary embodiments, the remote unit 104-1 is configured to transmit one downlink radio frequency signal to the one subscriber unit 106-1 using a radio frequency antenna 120-1 and another radio frequency signal to another subscriber unit 106 using another radio frequency antenna 120-F. In exemplary embodiments, other combinations of radio frequency antennas 120 and other components are used to communicate other combinations of radio frequency signals in other various radio frequency bands to various subscriber units 106, such as but not limited to using multiple radio frequency antennas 120 to communicate with a single subscriber unit 106.

Similarly in the reverse path, in exemplary embodiments each remote unit 104 is configured to receive uplink radio frequency signals from at least one subscriber unit 106 using at least one radio frequency antenna 120. Each remote unit 104 is further configured to convert the radio frequency signals to at least one uplink signal. In exemplary embodiments, at least one remote unit 104 is further configured to aggregate the at least one uplink signal with another uplink signal received from another remote unit 104 into an aggregate uplink signal and further configured to communicate the at least one uplink signal and/or the aggregate uplink signal across at least one media 118 to the distributed switching network 114. In exemplary embodiments, remote units 104 multiplex uplink signals in different bands onto the same interface for communication to the next upstream element. In other exemplary embodiments, the remote unit 104 aggregates (i.e. sums/combines) uplink signals in an intelligent manner. In exemplary embodiments, multiple uplink radio frequency channels are supported on a single band (such as for example two W-CDMA channels on a single band).

In exemplary embodiments, a master reference clock is distributed between the various components of the DAS 102A to keep the various components locked to the same clock. In exemplary embodiments, a master reference clock is provided to at least one external device 110A via the at least one upstream component 112A so that the external device 110A can lock to the master reference clock as well. In other exemplary embodiments, the master reference clock is provided from at least one external device 110A to the DAS 102A via the at least one upstream component 112A. In exemplary embodiments, the master reference clock is generated within a component of the DAS 102A, such as an upstream component 112A, a remote unit 104, or somewhere within the distributed switching network 114.

In exemplary embodiments, the DAS 102A is a digital distributed antenna system including a remote unit 104 configured to: (1) receive radio frequency signals from a subscriber unit 106; (2) convert the radio frequency signals into digital signals; and (3) communicate the digital signals through the DAS 102A and toward the upstream component 112A. In exemplary embodiments, the DAS 102A is a hybrid distributed antenna system including: (A) a remote unit 104 configured to: (1) receive radio frequency signals from a subscriber unit 106; (2) convert the radio frequency signals into analog signals; and (3) communicate the analog signals through the DAS 102A; and (B) an intermediary device (which could be positioned within the optional distributed switching network 114) configured to: (1) receive the analog signals from the remote unit 104; (2) convert the analog signals into digital signals; and (3) communicate the analog signals through the DAS 102A and toward the upstream component 112A. In exemplary embodiments, the DAS 102A is an analog distributed antenna system including a remote unit 104 configured to: (1) receive radio frequency signals from a subscriber unit 106; (2) convert the radio frequency signals into analog signals; and (3) communicate the analog signals through the DAS 102A and toward the upstream component 112A.

In exemplary embodiments, the external device 110A is a base station configured to receive the uplink signal. In exemplary embodiments, the uplink signal is formatted according to at least one of a Common Public Radio Interface (CPRI) standard, an Open Base Station Architecture Initiative (OBSAI) standard, and an Open Radio Interface (ORI) standard. In exemplary embodiments, the external device 110A is one of a Common Public Radio Interface (CPRI) device interface, an Open Base Station Architecture Initiative (OBSAI) device interface, and an Open Radio Interface (ORI) device interface. In other exemplary embodiments, the external device 110A is an analog base station that is configured to receive either intermediate frequency analog signals or radio frequency analog signals from the at least one upstream component 112A. In these exemplary embodiments, the uplink signal that is communicated to the external device 110A is either an intermediate frequency analog signal or a radio frequency analog signal.

In exemplary embodiments, each remote unit 104 radiates RF signals within a coverage area 122 (such as coverage area 122-1 from remote unit 104-A and coverage area 122-E from remote unit 104-E). The coverage areas 122 from all of the remote units 104 together form the DAS coverage area 124 for the DAS 102A. In exemplary embodiments, the coverage areas 122 and 124 are substantially confined within a building structure or other area to avoid interference with the coverage areas of other base stations, DAS, etc. In exemplary embodiments, the exterior walls of a building, structure, or other enclosed space are more difficult for RF signals to penetrate and the signals become substantially attenuated by the exterior walls. In the exemplary embodiment shown in FIG. 1A, the subscriber unit 106-1 is within the coverage area 122-1 of remote unit 104-1, which is a part of the DAS coverage area 124. Similarly, the subscriber unit 106-A is within the coverage area 122-E of the remote unit 104-E, which is part of the DAS coverage area 124.

In exemplary embodiments, an interfering device 108A (such as a macrocell base station, a different remote unit of a different distributed antenna system, a remote radio head of a distributed base station, a small-cell base station such as a femtocell, picocell, or microcell, or other interference causing device) radiates radio frequency (RF) signals from at least one antenna 126 (such as antenna 126-1 and any quantity of optional additional antennas 126 through optional additional antenna 126-K). The RF signals from the interfering device 108A can enter into the coverage area 124 of the DAS 102A and the coverage area 122 of a remote unit 104. For example, the RF signals from the interfering device 108A can penetrate through exterior walls (or boundaries) of the building, structure, or other enclosed space, etc. and into the coverage areas 122 and 124.

These RF signals from the interfering device 108A can interfere with the RF signals emitted from the remote units 104 of the DAS 102A. In exemplary embodiments, the interfering RF signals from outside the DAS coverage area 124 cause interference because they are on the same frequency, band, etc. as the signals transmitted from the remote units 104 of the DAS 102A. This is particularly a problem when the RF signals from the interfering device 108A are high power and/or when the RF signals from the interfering device 108A are transmitted from nearby antennas 126. In order to improve the signal coverage inside the coverage area 124 of the DAS 102A while these interfering signals from the interfering device 108A outside the DAS coverage area 124 are present, the remote units 104 of the DAS 102A can increase their transmission power to have adequate signal to noise ratio (SNR) for subscriber units 106 who are close to the perimeter of the coverage area 124 (such as just inside a buildings walls), to overcome the higher power interference signals from outside of the coverage area 124 (such as the building walls). In exemplary embodiments, the remote units 104 of the DAS 102A can increase their transmission power intelligently based on information received from the interfering devices 108A outside of the DAS coverage area 124. In exemplary embodiments, remote units 104 are reconfigured to receive signals from the interfering device 108A to determine how to adjust the signal being transmitted from the remote units 104. In some implementations, the remote units 104 receive information regarding the interfering device 108A from the upstream component 112A of the DAS 102A. In exemplary embodiments, the upstream component is at least one of a master unit or a network interface unit. While increasing and/or decreasing transmission power of the at least one remote unit 104 is described herein, it is understood that the transmission signals from the at least one remote unit 104 can be adjusted in other ways to cause the subscriber units 106 to camp on the at least one remote units 104 rather than the interfering device 108A. In exemplary embodiments, a number of criteria are taken into account to determine how much to increase and/or decrease the transmission power of the at least one remote unit 104. In exemplary embodiments, balancing between remote units would also be taken into consideration. In exemplary embodiments, the Signal to Noise ratio and/or throughput can be determined and/or adjusted to accommodate targets.

In exemplary embodiments, Reference Signal Received Power (RSRP) is fixed for each base station to define its coverage. In exemplary embodiments, subscriber units 106 detect RSRP along with other parameters to determine which cell within a cellular network to park on with which to receive and/or transmit signals. In exemplary embodiments, at least one remote unit 104 are temporarily reconfigured to receive signals from the interfering device 108A in order to determine the RSRP for the interfering device 108A and use this information to increase the transmission power from the at least one remote unit 104 so that the subscriber units 106 within the coverage area 124 will camp on the at least one remote unit 104 of the DAS 102A rather than the interfering device 108A. In exemplary embodiments, the temporary reconfiguring of the at least one remote unit 104 is considered reconfiguring the at least one remote unit 104 for sniffing. In exemplary embodiments, the at least one remote unit 104 is reconfigured to use the uplink as a receiver tuned to the downlink frequency so that it can receive the downlink from the interfering device 108A. In exemplary embodiments, once the at least one remote unit 104 receives the signals from the interfering device 108A in order to determine the RSRP for the interfering device 108A, it is configured back for regular operation. While RSRP is described throughout this disclosure, it is understood that in other embodiments other measurements relating to the interfering device 108A could be sniffed from interfering devices and used to make the decision as to whether to adjust an attribute (such as the signal strength) at the at least one remote unit 104, such as Reference Signal Received Quality (RSRQ), ReferenceSignalPower in System Information Block 2 (SIB2), Qhyst in System Information Block 3 (SIB3), and Qoffset in System Information Block 4 (SIB4). In exemplary embodiments, ReferenceSignalPower in SIB2, Qhyst in SIB3, and Qoffset in SIB4 can be used together to map the interfering devices 108A and be used to make a decision as to whether to adjust an attribute (such as the signal strength) at the at least one remote unit 104. In exemplary embodiments where the interfering device 108A implements Time Division Duplexing (TDD) (such as a TDD eNodeB) in the downlink, it can be difficult to sniff the TDD downlink signals while a subscriber unit 106 is present near the remote unit 104 and it can be useful to sniff obtain additional information regarding the presence and parameters of the interfering device 108A implementing TDD (such as a TDD eNodeB).

In exemplary embodiments, while the at least one remote unit 104 is temporarily reconfigured to receive signals from the interfering device 108A, the remote unit will not be performing its regular communication with subscriber units. Accordingly, there will be a service interruption during this time. In other embodiments, the temporary reconfiguring of the at least one remote unit 104 does not result in service interruption, though it may result in poor coverage within the coverage area 124 of the DAS 102A or at least one of the coverage areas 122 of the corresponding remote units 104. In exemplary embodiments, signals from outside of the coverage area 124 of the DAS 102A and/or coverage area 122 of the corresponding remote units 104 may still allow for reduced strength coverage within the coverage area 124 and/or the coverage areas 122 while the at least one remote unit 104 is reconfigured to receive signals from the interfering device 108A. It is desirable to minimize the time during which the at least one remote unit 104 is temporarily reconfigured to receive signals from the interfering device 108A to minimize the down-time and/or time during which there is poor coverage.

In exemplary embodiments, every band in the region would need to be scanned by the reconfigured at least one remote unit 104 to find all the interfering devices 108A. For example, there may be a number of base stations from a number of different cellular operators which are interfering devices 108A. It can take some time to scan for all of these, or even only to scan for operators who have base stations feeding the DAS 102A. Additionally, the service interruption time can vary by a large amount because scanning a band can take a long time and scanning multiple bands can take even longer. In exemplary embodiments, additional things can be done to help minimize the down-time and/or time during which there is a poor coverage. For example, if there is some knowledge about which frequencies those in-building operators have operated on, then the RSRP measurement can be limited to a subset of the potentially interfering devices (such as outside macrocell base stations) to a shorter time. In exemplary embodiments, it is only necessary to find the RSRP of the operator's carrier that is the same as the operator's carrier used by the DAS 102A. In exemplary embodiments, it depends on how many operators are connecting to the DAS 102A, but it is possible to determine what frequencies and/or bands the operators will be operating on within the DAS 102A.

In exemplary embodiments, the DAS 102A can detect signals from the external devices 110A (such as eNodeBs, NodeBs, and/or 2G base stations) that is used to identify information about the interfering devices 108A. In exemplary embodiments, this detection is already implemented in the DAS 102A with database support. In exemplary embodiments, this information is extracted from the Master Information Block (MIB) and/or a System Information Block (SIB) (such as SIB 1, 2, 3, 4, 5, 6, or 7) from an LTE and/or LTE advanced signal. In exemplary embodiments, this information can be received from the SIB 4 from an LTE and/or LTE advanced signal. In other embodiments, this information is received from other blocks, such as with other types of 2G, 3G, 4G, 5G, etc. signals.

In exemplary embodiments, the receiver of the at least one remote unit 104 is capable of decoding higher SIB, such as SIB 4 and/or SIB 5 from the signals received from at least one of the external devices 110A. Previously, it was not necessary to have the receiver of remote units decode higher than SIB 1 and/or SIB 2. Said another way, the receiver of the at least one remote unit is capable of decoding information to aid in more quickly finding the interfering device 108A. In exemplary embodiments, the information retrieval from the MIB and/or SIB requires additional MIB and/or SIB to be decoded by the DAS 102A than were previously decoded. For example, while it may otherwise only be necessary for the DAS 102A to decode SIB 2, this additional information necessary to minimize the down-time may be retrieved by decoding SIB 3-7 (which may have additional information related to how mobile handover and/or transition between neighboring cells occurs). In exemplary embodiments, this information is used by the subscriber units 106 before they can make a decision for handover with assistance from one base station to another. In exemplary embodiments, it was not previously helpful for the DAS 102A to decode this information as it was only used by the subscriber units 106 to make decisions as to transitions to neighboring cells. In exemplary embodiments, the SIB 4 is decoded to extract neighboring cell information, such as cell ID and/or additional parameters.

The neighboring cell information (such as cell ID) can be used to sniff on the relevant frequency. The neighboring cell information is used to shorten data capture to result in quicker measurement of the RSRP of the interfering device 108A. In exemplary embodiments, by having the cell ID (or other neighboring cell information) of the interfering device 108A, the process of decoding the RSRP is greatly reduced because they are targeting the search to the specific interfering device 108A. Without the cell ID (or other neighboring cell information), the at least one remote unit 104 would have to search through many more cell IDs (potentially more than 500) to identify the interfering device 108A. In exemplary embodiments, cell ID (or other neighboring cell information) is obtained for more than one surrounding cell depending on the layout of the network, though the search will still be greatly reduced to just a few cell IDs.

In exemplary embodiments, by detecting information regarding the neighboring cells from the SIB 4 from the external devices 110A, the time during which the at least one remote unit is reconfigured/re-tuned to listen to the downlink from the interfering device 108 to get the RSRP of that signal is minimized. Then, if the RSRP of the interfering device 108A measured at the at least one remote unit 104 is high, the at least one remote unit 104 can adjust its transmission power to overcome the high signal strength of the interfering device 108A. In contrast, if the RSRP of the interfering device 108A measured at the at least one remote unit 104 is relatively low, the at least one remote unit 104 can maintain the current power level. In exemplary embodiments, if the RSRP of the interfering device 108A measured at the at least one remote unit 104 is very low and/or near the noise floor, the transmission power level of the at least one remote unit 104 may even be reduced/attenuated. This may depend on various factors, such as the size of coverage areas 122 and/or 124.

While detection of neighboring cell information is described herein, it is understood that there may be other ways in which the search for the RSRP of the interfering device 108A is narrowed down to reduce the down-time. For example, information regarding neighboring cell information could be stored in the DAS 102A rather than received from the external devices 110A. In exemplary embodiments, the neighboring cell information could be updated in the DAS 102A. In exemplary embodiments, the neighboring cell information could be received from an external server or another source.

In exemplary embodiments, the determination of RSSI at one remote unit 104 of the DAS 102A can be used to make a determination of whether or not to adjust the transmission power level of other remote units 104 within the DAS 102A. In exemplary embodiments, a path loss between remote units 104 within the DAS 102A can be calculated to determine how to adjust transmission power levels of other remote units 104 within the DAS 102A. In exemplary embodiments, interference from another remote unit 104 of the DAS 102A would be present if the at least one remote unit 104 of the DAS 102A is reconfigured to sniff for the downlink signals from the interfering device 108A while the another remote unit 104 of the DAS 102A is still transmitting. Even though their cell IDs are different and the reconfigured DAS 102A targets specific cell ID signals, the other transmitting remote units 104 can still cause some interference. Accordingly, in exemplary embodiments it is necessary to stop transmission from other remote units 104 of the DAS 102A while the at least one remote unit 104 of the DAS 102A is reconfigured to sniff for the downlink signals from the interfering device 108A. In other exemplary embodiments, the transmission of the other remote units 104 is not completely stopped while the at least one remote unit 104 of the DAS 102A is reconfigured to sniff for the downlink signals from the interfering device 108A. Rather, the other remote units 104 of the DAS 102A are configured to operate at a reduced transmission power while the at least one remote unit 104 of the das 102A is reconfigured to sniff for the downlink signals from the interfering device 108A. By either disabling transmission from or reducing transmission power of the other remote units 104 during sniffing by the at least one remote unit 104, the at least one remote unit 104 can obtain more accurate RSRP measurements of outside macrocell base stations.

FIG. 1B is a block diagram of an exemplary embodiment of a communication system 100B. Communication system 100B includes a distributed antenna system (DAS) 102B having at least one remote unit 104 (such as remote unit 104-1 through any quantity of optional remote units 104 through optional remote unit 104-E), at least one subscriber unit 106 (such as subscriber unit 106-1 and any quantity of optional subscriber units 106 through optional subscriber unit 106-A), and at least one master unit 112B. Communication system 100B and DAS 102B include similar components to communication system 100A and DAS 102A and operate according to similar principles and methods as communication system 100A and DAS 102A described above. The differences between communication system 100B and DAS 102B and communication system 100A and DAS 102A is that the upstream component 112B of DAS 102B is specifically identified as a master unit 112B in DAS 102B; that the external devices 100A of the communication system 100A are specifically identified as base stations 110B in the communication system 100B; and that the interfering device of the communication system 100A is specifically identified as a macrocell base station 108B in the communication system 100B.

FIG. 1C is a block diagram of an exemplary embodiment of a communication system 100C. Communication system 100C includes a distributed antenna system (DAS) 102C having at least one remote unit 104 (such as remote unit 104-1 through any quantity of optional remote units 104 through optional remote unit 104-E), at least one subscriber unit 106 (such as subscriber unit 106-1 and any quantity of optional subscriber units 106 through optional subscriber unit 106-A), and at least one network interface 112C. Communication system 100C and DAS 102C include similar components to communication system 100A and DAS 102A and operate according to similar principles and methods as communication system 100A and DAS 102A described above. The differences between communication system 100C and DAS 102C and communication system 100A and DAS 102A is that the upstream component 112C of DAS 102C is specifically identified as at least one network interface 112C (such as network interface 112C-1 and any quantity of optional network interfaces 112C through optional network interface 112C-B) in DAS 102C; that the external devices 100A of the communication system 100A are specifically identified as base stations 110B in the communication system 100B; and that the interfering device of the communication system 100A is specifically identified as a macrocell base station 108B in the communication system 100B.

FIG. 2 is a block diagram of an exemplary embodiment of a remote unit 104 used in distributed antenna systems, such as any of exemplary distributed antenna systems 100A-100C described above. The remote unit 104 includes an optional signal multiplexing module 202, at least one receiver 204 (including receiver 204-1 and any quantity of optional receivers 204, any of which can be integrated into optional transceivers 208, such as optional transceiver 208-1), optional RF diplexers 210, at least one upstream interface 212, optional Ethernet interface 214, optional clock unit 216, optional processor 218, optional memory 220, and optional power supply 222. In exemplary embodiments, optional RF diplexers (such as optional RF diplexer 210-1 or optional RF diplexer 210-2) are used to combine the received and transmitted signals onto a single antenna 120. In exemplary embodiments, optional signal multiplexing module 202, at least one receiver 204, at least one transmitter 206, and/or the at least one upstream interface 212 are implemented at least in part by optional processor 218 and optional memory 220. In exemplary embodiments, optional power supply 222 is used to power the various components of the remote unit 104.

In exemplary embodiments, optional signal multiplexing module 202 receives at least one downlink signal from at least one upstream component 112A through the distributed switching network 114. In exemplary embodiments, the at least one downlink signal is received through the at least one upstream interface 212. In exemplary embodiments where the downlink signal is an optical signal, the at least one upstream interface 212 converts the downlink signal from an optical format to an electrical format. In exemplary embodiments, more input lines and/or more at least one upstream interface 212 are included in the remote unit 104. In exemplary embodiments, the optional signal multiplexing module 202 splits apart an aggregate downlink signal into at least one downlink signal that is sent to transmitter 206-1 for eventual transmission as a radio frequency on radio frequency antenna 120-1. In exemplary embodiments, the optional signal multiplexing module 202 splits apart the aggregate downlink signal into a plurality of downlink signals that are sent to a plurality of transmitters 206 for eventual transmission as radio frequency signals at radio frequency antennas 120.

In exemplary embodiments, optional signal multiplexing module 202 receives at least one uplink signal from at least one receiver 204. In exemplary embodiments, the optional signal multiplexing module 202 receives a plurality of uplink signals from a plurality of receivers 204. In exemplary embodiments, the optional signal multiplexing unit aggregates at least one uplink signal received from a receiver 204-1 with another uplink signal received from another receiver 204. In exemplary embodiments, the optional signal multiplexing module 202 aggregates a plurality of uplink signals into a single aggregate uplink signal. In exemplary embodiments, the aggregate uplink signal is provided to at least one upstream interface 212 which converts the aggregate uplink signal from electrical signals to optical signals before communicating the aggregate uplink signal to the distributed switching network 114 through the distributed switching network 114. In other embodiments, the aggregate uplink signal is communicated as electrical signals toward the distributed switching network 114. In exemplary embodiments, the aggregate uplink signal is converted to optical signals at another place in the distributed antenna system 100.

In exemplary embodiments without optional signal multiplexing module 202, the at least one upstream interface 212 receives an uplink signal from the receiver 204-1 which converts the uplink signal from electrical signals to optical signals before communicating the uplink signal to the distributed switching network 114 through the distributed switching network 114. In other embodiments, the uplink signal is communicated as electrical signals toward the distributed switching network 114. In exemplary embodiments, the uplink signal is converted to optical signals at another place in the distributed antenna system.

In exemplary embodiments, the optional Ethernet interface 214 receives a downlink signal from the optional signal multiplexing module 202 and converts it to Ethernet packets and communicates the Ethernet packets with an internet protocol network device. The optional Ethernet interface 214 also receives Ethernet packets from the internet protocol network device and converts them to an uplink signal and communicates it to the optional signal multiplexing module 202. In exemplary embodiments having the optional Ethernet interface 214, a corresponding external device 110A that is an Ethernet interface interfaces with an upstream component 112A that is an Ethernet interface.

In exemplary embodiments, the optional clock unit 216 extracts the master reference clock from the downlink signal and uses this master clock within the remote unit 104 to establish a common time base in the remote unit 104 with the rest of the distributed antenna system 100. In exemplary embodiments, the optional clock unit 216 generates a master reference clock and distributes the generated master reference clock to other components of the distributed antenna system 100 (and even the external devices 110) in the upstream using the uplink signal.

In exemplary embodiments, at least one receiver 204 is temporarily reconfigured to receive signals from the interfering device 108A. In exemplary embodiments, the remote unit 104 is configured to use information regarding the interfering device 108A received from the upstream component 112A (such as master unit 112B and/or network interface 112C) of the DAS 102A to more quickly tune to the correct frequency and sniff the desired interference signals from the interfering device 108A. In exemplary embodiments, the remote unit 104 is configured to extract information regarding the interfering device 108A and/or interference signals from the received interference signal using the at least one receiver 204 and/or processor 218. In exemplary embodiments, the remote unit 104 is configured to extract the Reference Signal Received Power (RSRP) from the interference signal received from the interfering device 108A. In exemplary embodiments, the remote unit 104 is configured to adjust at least one attribute (such as the transmission power of the at least one transmitter 206) to cause the subscriber units 106 to connect to and/or camp on the at least one remote unit 104 rather than the interfering device 108A. In exemplary embodiments, a number of criteria are taken into account to determine how much to increase and/or decrease the transmission power of the at least one remote unit 104. In exemplary embodiments, the Signal to Noise ratio and/or throughput can be determined and/or adjusted to accommodate targets.

In exemplary embodiments, once the at least one remote unit 104 receives the signals from the interfering device 108A in order to determine the information regarding the interfering device 108A (such as RSRP), it is configured back for regular operation. While RSRP is described throughout this disclosure, it is understood that in other embodiments other measurements relating to the interfering device 108A could be sniffed from interfering devices and used to make the decision as to whether and by how much to adjust an attribute (such as the signal strength) at the at least one remote unit 104, such as Reference Signal Received Quality (RSRQ), ReferenceSignalPower in System Information Block 2 (SIB2), Qhyst in System Information Block 3 (SIB3), and Qoffset in System Information Block 4 (SIB4). In exemplary embodiments, ReferenceSignalPower in SIB2, Qhyst in SIB3, and Qoffset in SIB4 can be used together to map the interfering devices 108A and be used to make a decision as to whether and by how much to adjust an attribute (such as the signal strength) at the at least one remote unit 104. It is desired that the duration during which the at least one remote unit is reconfigured is minimized to minimize the service interruption and/or poor coverage caused by the at least one remote unit 104 not performing its regular communication with subscriber units 106.

In exemplary embodiments where the remote unit 104 does not receive information regarding the interfering devices 108A from the upstream component 112A, every band in the region would need to be scanned by the reconfigured at least one remote unit 104 to find all the interfering devices 108A. In exemplary embodiments where the remote unit 104 receives information regarding the interfering devices 108A from the upstream component 112A, only the relevant bands associated with the interfering device 108A need to be scanned by the reconfigured at least one remote unit 104 to find the interfering devices 108A.

FIG. 3 is a flow diagram illustrating one exemplary embodiment of a method 300 for adjusting at least one attribute of a remote unit in a distributed antenna system based on information regarding at least one interfering device. Exemplary method 300 begins at optional block 302 with optionally receiving identifying information regarding the at least one interfering device at the remote unit from an upstream component of the distributed antenna system. In exemplary embodiments, the identifying information includes a cell ID and/or additional parameters for the at least one interfering device. In exemplary embodiments, the at least one interfering device includes at least one of a macrocell base station, a different remote unit of a different distributed antenna system, a remote radio head of a distributed base station, and a small-cell base station. In exemplary embodiments, the at least one interfering device includes a single interfering device, while in other embodiments it includes two or more interfering devices. In exemplary embodiments, the distributed antenna system is within a building having exterior walls. In exemplary embodiments, the coverage area of the distributed antenna system is substantially within the exterior walls of the building. In exemplary embodiments, the at least one interfering device is outside of the exterior walls of the building.

Exemplary method 300 proceeds to optional block 304 with optionally identifying the at least one interfering device at the remote unit based on the identifying information received from the upstream component. In other embodiments, the identification of the interfering device occurs at another device other than the remote unit, such as an upstream component of the distributed antenna system (such as a host unit) and the identification is sent to the remote unit. In exemplary embodiments, this identification enables a reduction in time spent during subsequent portions of the method.

Exemplary method 300 proceeds to block 306 with temporarily reconfiguring at least one receiver in a remote unit of a distributed antenna system to receive interference signals from at least one interfering device outside of a coverage area of the distributed antenna system. In exemplary embodiments, the interference signals cause the at least one subscriber unit to establish a connection with the at least one interfering device rather than the remote unit of the distributed antenna system. In exemplary embodiments where the remote unit has the identity of the interference device (such as with optional block 304), this reconfiguring only needs to be done for a short time. In exemplary embodiments, temporarily reconfiguring the at least one receiver in the remote unit includes configuring the at least one receiver in the remote unit to target reception of Reference Signal Received Quality from the particular interference device based on the known identification of the interference device. In other embodiments, the remote unit needs to search through a number of options to find the interfering device. As described in more detail below, this method is used to adjust at least one attribute of the remote unit (such as a transmission power level of radio frequency signals transmitted from the remote unit) to cause the subscriber unit to establish connection with remote unit rather than the interfering device.

Exemplary method 300 proceeds to block 308 with receiving an interference signal from the at least one interfering device at the at least one receiver in the remote unit. Exemplary method 300 proceeds to optional block 310 with reconfiguring the at least one receiver in the remote unit of the distributed antenna system back to normal operation. While it is desirable to reconfigure the at least one receiver back to normal operation quickly after obtaining the interference signal to minimize downtime, it is understood that optional block 310 can occur at other times, such as after subsequent blocks.

Exemplary method 300 proceeds to block 312 with deriving information about the at least one interfering device from the interference signal at the remote unit. Exemplary method 300 proceeds to block 314 with adjusting at least one attribute of the remote unit to cause the at least one subscriber unit to establish a connection with the remote unit rather than the at least one interfering device. In exemplary embodiments, the at least one attribute includes the transmission power of the remote unit. In exemplary embodiments, the attribute (such as transmission power) can be increased or decreased. In exemplary embodiments, increasing the transmission power of the remote unit causes the subscriber units impacted by the interference signals to be more likely connect to and/or camp on the remote unit rather than the interfering device. In other embodiments, the at least one attribute includes other attributes related to the transmission that can be adjusted to cause the subscriber units impacted by the interference signals to be more likely to connect to and/or camp on the remote unit rather than the interfering device.

Any of the units, devices, processors, etc. described herein may implement at least some of the processing described herein. In exemplary embodiments, any of the units, devices, processors, etc. described herein include circuitry and/or a programmable processor, such as a microcontroller, an application-specific integrated circuit (ASIC), a field-programmable gate array (FPGA), a field-programmable object array (FPOA), or a programmable logic device (PLD). The units, devices, processors, etc. described herein may include or function with software programs, firmware or other computer readable instructions for carrying out various methods, process tasks, calculations, and control functions, described herein. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

EXAMPLE EMBODIMENTS

Example 1 includes a remote unit of a distributed antenna system, the remote unit comprising: at least one interface device configured to interface with an upstream component of the distributed antenna system; at least one receiver communicatively coupled to an antenna and configured to receive signals from at least one subscriber unit within a coverage area of the distributed antenna system; wherein the at least one receiver is configured to be temporarily reconfigured to receive interference signals from at least one interfering device outside of the coverage area of the distributed antenna system, wherein the interference signals cause the at least one subscriber unit to establish a connection with the at least one interfering device rather than the remote unit of the distributed antenna system; wherein the remote unit is configured to derive information about the at least one interfering device from the interference signals; wherein the remote unit is configured to adjust at least one attribute of the remote unit to cause the at least one subscriber unit to establish a connection with the remote unit rather than the at least one interfering device.

Example 2 includes the remote unit of Example 1, wherein the at least one interfering device includes at least one of a macrocell base station, a different remote unit of a different distributed antenna system, a remote radio head of a distributed base station, and a small-cell base station.

Example 3 includes the remote unit of any of Examples 1-2, wherein the distributed antenna system is within a building having exterior walls; wherein the coverage area of the distributed antenna system is substantially within the exterior walls of the building; and wherein the at least one interfering device is outside of the exterior walls of the building.

Example 4 includes the remote unit of any of Examples 1-3, wherein the at least one attribute includes transmission power.

Example 5 includes the remote unit of any of Examples 1-4, wherein the interference signal includes at least one of Reference Signal Received Power, Reference Signal Received Quality, ReferenceSignalPower, Qhyst, and Qoffset for the at least one interfering device.

Example 6 includes the remote unit of any of Examples 1-5, wherein the remote unit is further configured to: receive identifying information regarding the at least one interfering device through the at least one interface device from the upstream component of the distributed antenna system.

Example 7 includes the remote unit of Example 6, wherein the remote unit is further configured to: identify the at least one interfering device based on the identifying information received from the upstream component.

Example 8 includes the remote unit of any of Examples 6-7, wherein the identifying information includes a cell ID for the at least one interfering device.

Example 9 includes the remote unit of any of Examples 1-8, wherein the at least one interfering device includes a macrocell base station; wherein the interference signals include the Reference Signal Received Power for the macrocell base station; wherein the remote unit is further configured to receive a cell ID for the macrocell base station from the upstream component of the distributed antenna system; and wherein the remote unit is further configured to target reception of Reference Signal Received Power from the macrocell base station.

Example 10 includes the remote unit of any of Examples 1-9, further comprising: at least one processing device; and at least one memory communicatively coupled to the at least one processing device.

Example 11 includes a method for adjusting at least one attribute of a remote unit in a distributed antenna system based on information regarding at least one interfering device, the method comprising: temporarily reconfiguring at least one receiver in a remote unit of a distributed antenna system to receive interference signals from at least one interfering device outside of a coverage area of the distributed antenna system, wherein the interference signals cause the at least one subscriber unit to establish a connection with the at least one interfering device rather than the remote unit of the distributed antenna system; receiving an interference signal from the at least one interfering device at the at least one receiver in the remote unit; deriving information about the at least one interfering device from the interference signal at the remote unit; adjusting at least one attribute of the remote unit to cause the at least one subscriber unit to establish a connection with the remote unit rather than the at least one interfering device.

Example 12 includes the method of Example 11, wherein the at least one interfering device includes at least one of a macrocell base station, a different remote unit of a different distributed antenna system, a remote radio head of a distributed base station, and a small-cell base station.

Example 13 includes the method of any of Examples 11-12, wherein the distributed antenna system is within a building having exterior walls; wherein the coverage area of the distributed antenna system is substantially within the exterior walls of the building; and wherein the at least one interfering device is outside of the exterior walls of the building.

Example 14 includes the method of any of Examples 11-13, wherein the at least one attribute includes transmission power.

Example 15 includes the method of any of Examples 1-14, wherein the interference signal includes at least one of Reference Signal Received Power, Reference Signal Received Quality, ReferenceSignalPower, Qhyst, and Qoffset for the at least one interfering device.

Example 16 includes the method of any of Examples 11-15, further comprising: receiving identifying information regarding the at least one interfering device at the remote unit from an upstream component of the distributed antenna system Example 17 includes the method of Example 16, further comprising: identifying the at least one interfering device at the remote unit based on the identifying information received from the upstream component.

Example 18 includes the method of any of Examples 16-17, wherein the identifying information includes a cell ID for the at least one interfering device.

Example 19 includes the method of any of Examples 1-18, further comprising: wherein the at least one interfering device includes a macrocell base station; wherein the interference signals include the Reference Signal Received Power for the macrocell base station; receiving a cell ID for the macrocell base station at the remote unit from an upstream component of the distributed antenna system; and targeting reception of Reference Signal Received Power information at the remote unit from the macrocell base station.

Example 20 includes a remote unit of a distributed antenna system, the remote unit comprising: at least one interface device configured to interface with an upstream component of the distributed antenna system; at least one receiver communicatively coupled to an antenna and configured to receive signals from at least one subscriber unit within a coverage area of the distributed antenna system; wherein the at least one receiver is configured to be temporarily reconfigured to receive interference signals from at least one interfering device outside of the coverage area of the distributed antenna system, wherein the interference signals cause the at least one subscriber unit to establish a connection with the at least one interfering device rather than the remote unit of the distributed antenna system; wherein the remote unit is configured to derive information about the at least one interfering device from the interference signals; wherein the remote unit is configured to adjust at least one attribute of the remote unit to cause the at least one subscriber unit to establish a connection with the remote unit rather than the at least one interfering device.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A remote unit of a distributed antenna system, the remote unit comprising:
    at least one interface device configured to interface with an upstream component of the distributed antenna system;
    at least one receiver communicatively coupled to an antenna and configured to receive signals from at least one subscriber unit within a coverage area of the distributed antenna system;
    wherein the at least one receiver is configured to be temporarily reconfigured to receive interference signals from at least one interfering device outside of the coverage area of the distributed antenna system, wherein the interference signals cause the at least one subscriber unit to establish a connection with the at least one interfering device rather than the remote unit of the distributed antenna system;
    wherein the remote unit is configured to derive information about the at least one interfering device from the interference signals; and
    wherein the remote unit is configured to adjust at least one attribute of the remote unit to cause the at least one subscriber unit to establish a connection with the remote unit rather than the at least one interfering device.

2. The remote unit of claim 1, wherein the at least one interfering device includes at least one of a macrocell base station, a different remote unit of a different distributed antenna system, a remote radio head of a distributed base station, and a small-cell base station.

3. The remote unit of claim 1, wherein the distributed antenna system is within a building having exterior walls;
    wherein the coverage area of the distributed antenna system is substantially within the exterior walls of the building; and
    wherein the at least one interfering device is outside of the exterior walls of the building.

4. The remote unit of claim 1, wherein the at least one attribute includes transmission power.

5. The remote unit of claim 1, wherein the interference signals include at least one of Reference Signal Received Power, Reference Signal Received Quality, ReferenceSignalPower, Qhyst, and Qoffset for the at least one interfering device.

6. The remote unit of claim 1, wherein the remote unit is further configured to:
receive identifying information regarding the at least one interfering device through the at least one interface device from the upstream component of the distributed antenna system.

7. The remote unit of claim 6, wherein the remote unit is further configured to:
identify the at least one interfering device based on the identifying information received from the upstream component.

8. The remote unit of claim 6, wherein the identifying information includes a cell ID for the at least one interfering device.

9. The remote unit of claim 1, wherein the at least one interfering device includes a macrocell base station;
wherein the interference signals include Reference Signal Received Power for the macrocell base station;
wherein the remote unit is further configured to receive a cell ID for the macrocell base station from the upstream component of the distributed antenna system; and
wherein the remote unit is further configured to target reception of Reference Signal Received Power from the macrocell base station.

10. The remote unit of claim 1, further comprising:
at least one processing device; and
at least one memory communicatively coupled to the at least one processing device.

11. A method for adjusting at least one attribute of a remote unit in a distributed antenna system based on information regarding at least one interfering device, the method comprising:
temporarily reconfiguring at least one receiver in a remote unit of a distributed antenna system to receive interference signals from at least one interfering device outside of a coverage area of the distributed antenna system, wherein the interference signals cause at least one subscriber unit to establish a connection with the at least one interfering device rather than the remote unit of the distributed antenna system;
receiving an interference signal from the at least one interfering device at the at least one receiver in the remote unit;
deriving information about the at least one interfering device from the interference signal at the remote unit; and
adjusting at least one attribute of the remote unit to cause the at least one subscriber unit to establish a connection with the remote unit rather than the at least one interfering device.

12. The method of claim 11, wherein the at least one interfering device includes at least one of a macrocell base station, a different remote unit of a different distributed antenna system, a remote radio head of a distributed base station, and a small-cell base station.

13. The method of claim 11, wherein the distributed antenna system is within a building having exterior walls;
wherein the coverage area of the distributed antenna system is substantially within the exterior walls of the building; and
wherein the at least one interfering device is outside of the exterior walls of the building.

14. The method of claim 11, wherein the at least one attribute includes transmission power.

15. The method of claim 11, wherein the interference signal includes at least one of Reference Signal Received Power, Reference Signal Received Quality, ReferenceSignalPower, Qhyst, and Qoffset for the at least one interfering device.

16. The method of claim 11, further comprising:
receiving identifying information regarding the at least one interfering device at the remote unit from an upstream component of the distributed antenna system.

17. The method of claim 16, further comprising:
identifying the at least one interfering device at the remote unit based on the identifying information received from the upstream component.

18. The method of claim 16, wherein the identifying information includes a cell ID for the at least one interfering device.

19. The method of claim 11, further comprising:
wherein the at least one interfering device includes a macrocell base station;
wherein the interference signals include Reference Signal Received Power for the macrocell base station;
receiving a cell ID for the macrocell base station at the remote unit from an upstream component of the distributed antenna system; and
targeting reception of Reference Signal Received Power information at the remote unit from the macrocell base station.

20. A remote unit of a distributed antenna system, the remote unit comprising:
at least one interface device configured to interface with an upstream component of the distributed antenna system;
at least one receiver communicatively coupled to an antenna and configured to receive signals from at least one subscriber unit within a coverage area of the distributed antenna system;
wherein the at least one receiver is configured to be temporarily reconfigured to receive interference signals from at least one interfering device outside of the coverage area of the distributed antenna system, wherein the interference signals cause the at least one subscriber unit to establish a connection with the at least one interfering device rather than the remote unit of the distributed antenna system;
wherein the remote unit is configured to receive identifying information regarding the at least one interfering device through the at least one interface device from the upstream component of the distributed antenna system;
wherein the remote unit is configured to identify the at least one interfering device based on the identifying information received from the upstream component; and
wherein the remote unit is configured to adjust at least one attribute of the remote unit to cause the at least one subscriber unit to establish a connection with the remote unit rather than the at least one interfering device.

* * * * *